9333X
J. Barrett,
Flour Packer.
Patented Jan. 23, 1836.
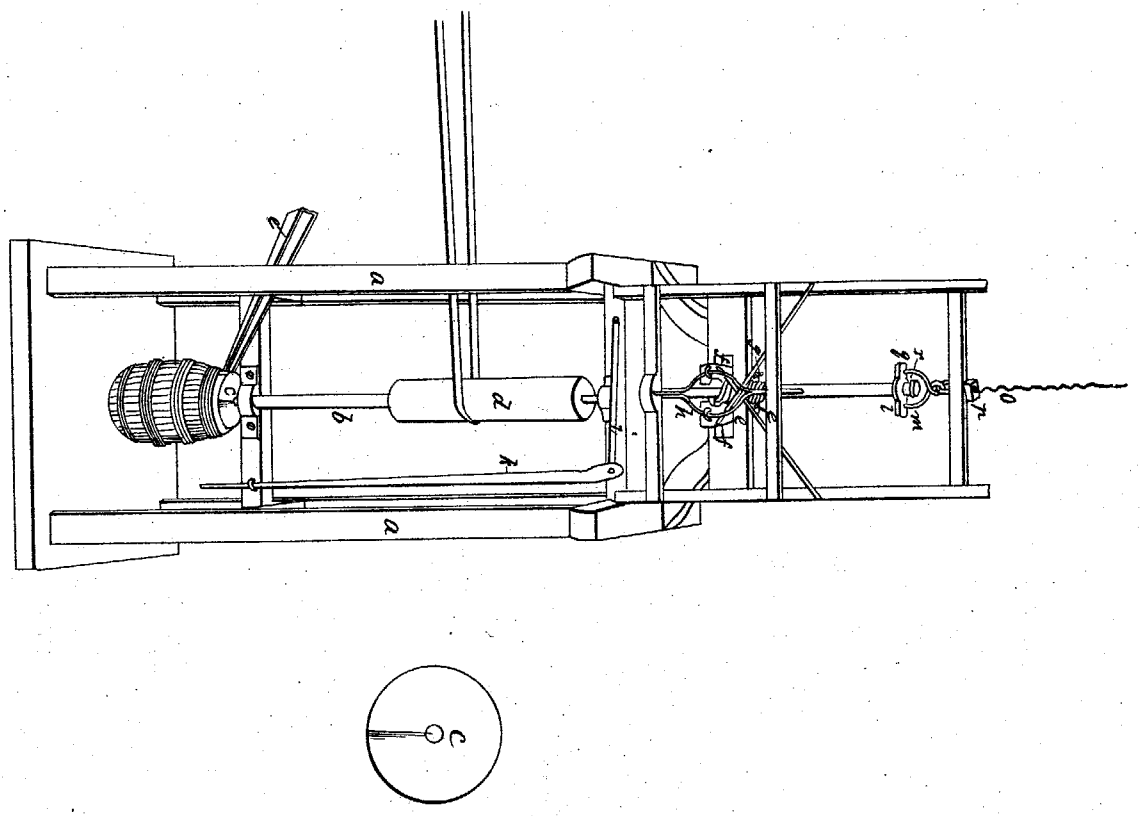
AM. PHOTO-LITHO. CO. N.Y. (OSBORNE'S PROCESS)

1/23/1836 9333X

Jan. 23. 1836 309

Jonathan Barrell of Granville New York.

Letters Letters

The schedule referred to in these Letters Patent and making part of the same containing a description in the words of the said Jonathan F. Barrell himself of his improvement in the machine for packing & pressing Flour.

Be it known that I Jonathan F. Barrell of Granville Washington County State of New York have made a new and useful improvement in be-ing a machine for pressing flour into barrels for market by a screw & weight which is described as follows, reference being had to the annexed drawings of the same making part of this Specification.

By this machine the expensive laborious & unwholesome method of shovelling punching and levelling flour into barrels is rendered entirely unnecessary. The principle feature of my machine consists in its pressing the flour by means of a screw about the size of a barrel head commencing at the bottom of the barrel and rising according to the speed of the machinery to the top. The machine consists of a suitable frame (a) to contain the necessary machinery. in the centre of which frame is a vertical shaft (b) having a screw (c) on its lower end about the size of a Barrel head for the purpose of pressing the flour. On this shaft is a drum (d) about 4 or 5 feet long and of any required diameter turned by a band from the driving power, which drum is weighted for the purpose of giving the necessary pressure to the flour. Near the upper end of the shaft is a male screw (e) working in a female screw (f). made in two parts connected together by a joint (g) in such a manner that they may be opened when it is required to throw the screws out of gear, and closed when required to be thrown in gear in order to raise the screw presser entirely from the barrel. The opening and closing of the female screw is effected by a piece of iron (h) shaped something like a N connected to and operated by a lever (i) turning on a pin the lever being moved by a rod (k). the upper end of the shaft (b) is shaped like a swivel, to which is attached loosely a ball (m) to this ball is connected a tongue (o) passing throa nut (p) placed on the top of a cross piece of the frame for the purpose of
lowering gradually the screw presser to the bottom of the Barrels, there
being projections (q) on the Ball, striking against corresponding projec-
tions (r) on the swivel head which thus connect the shaft and screw
together and cause them to turn in the same direction in descending.
An inclined spout (s) to receive the flour from the elevators and
convey it to the Barrel is secured in the frame in a suitable and
convenient manner. The operation of the machine is as follows.
An empty Barrel is placed under the screw presser its centre being in
a line with the centre of the shaft. The female screw is opened by the
lever and apparatus for that purpose, the screw presser is then run down
to the bottom of the Barrel. The driving machinery being set in motion
by water or other power the band from it passing round the drum
turns it and the shaft on which it is fastened, and also the screw pres
ser at the lower end of the shaft, the flour all the time running in
to the Barrel from the spout, having been raised from the meal chest
by common elevators and passes through the screw presser, the up-
per wing of which gathering it in whilst the lower wing presses it even
ly and equally from the bottom to the top of the Barrel to any degree
of compactness according the weight put on the shaft of the presser.
When the Barrel is full the female clamp screw is closed which puts
the mill screw in gear and raises the screw presser entirely out of the
barrel and holds it in a stationary position. This Barrel is then removed
and an empty barrel put in its place, and the operation repeated as be-
fore described. One person only is required to take away the full barrels
and replace them with empty ones. About three minutes is all the time that
is required to press a barrel of flour: though the manual labour is not
more than five seconds and during the operation it bursts no hoops
and no flour is pressed out at the sides of the barrel as it packs &
presses the flour even and equally throughout. One man with this
machine can press as many Barrels of flour in any given time as he
can weigh and head up. he may pack weigh and nail off about 20
barrels per hour with a machine which I have made and used with

1/23/1836 9333X

371 a view to test the improvement. The size and proportions of the machine
may be varied and its motion graduated so as to work faster or slower.
What I claim as my invention & improvement, and which has never be-
fore been known is the before described machine for pressing flour
into barrels, particularly the mode of pressing it by a screw on
the end of a weighted shaft and working upward from the bottom
of the barrel as herein set forth. However I do not intend to
confine myself to the exact form and dimensions which I have
described in the foregoing specification and drawings, but I intend
to vary the same to suit circumstances, whilst similar results are
attained by means substantially the same.

Witnesses
Wm. P. Elliot
Sam. Mellinius

Jonathan H. Barrett

[illegible]
[illegible]

Claim 120

1050

(1026 words)

(January 23. 1836)

Drawing